Dec. 14, 1954 T. G. REYNOLDS 2,697,067
METHOD AND APPARATUS FOR COKE OVEN BY-PRODUCT RECOVERY
Filed Sept. 26, 1950 2 Sheets-Sheet 2
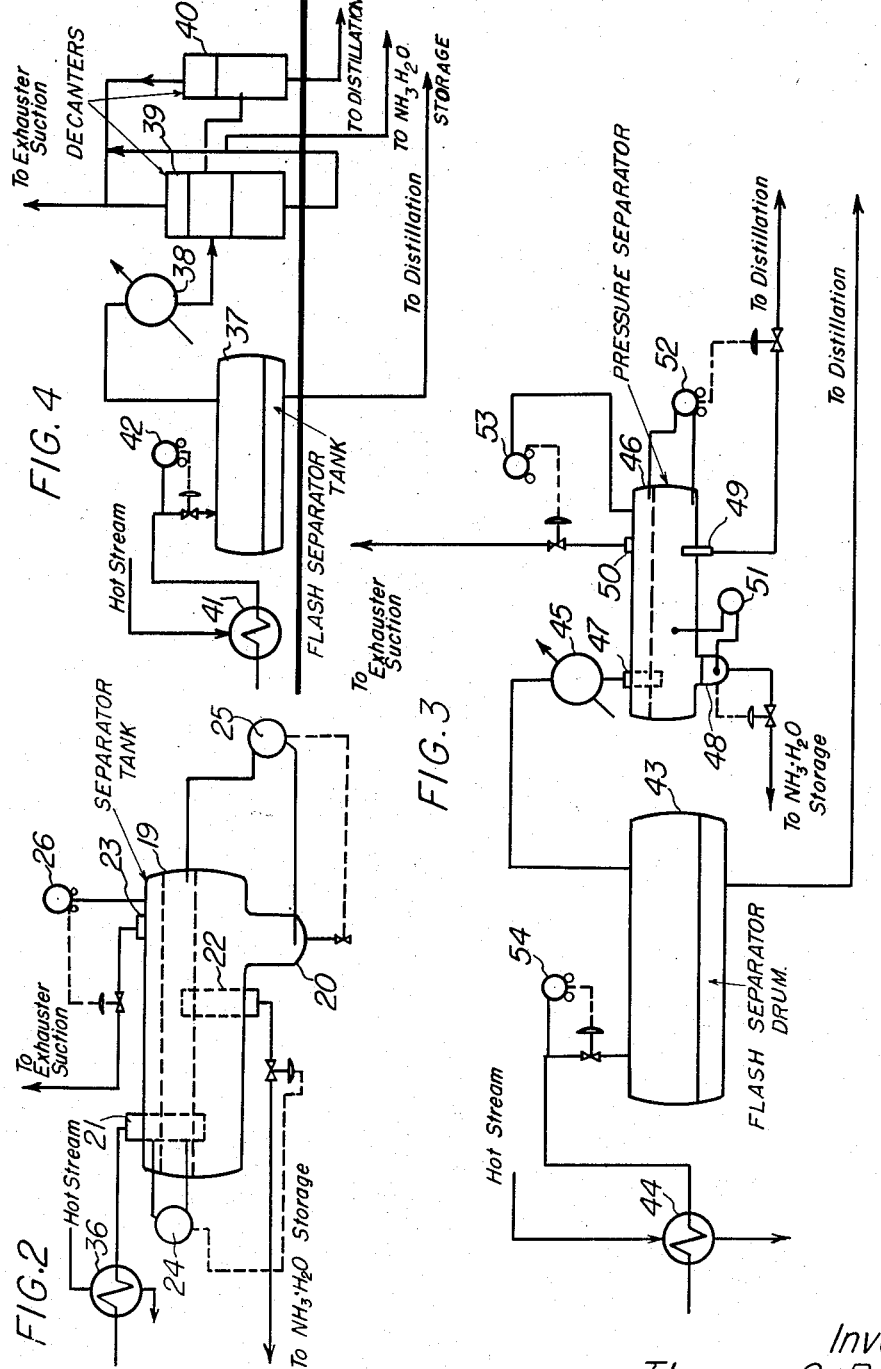
Inventor
Thomas G. Reynolds
By his attorneys
Howson and Howson

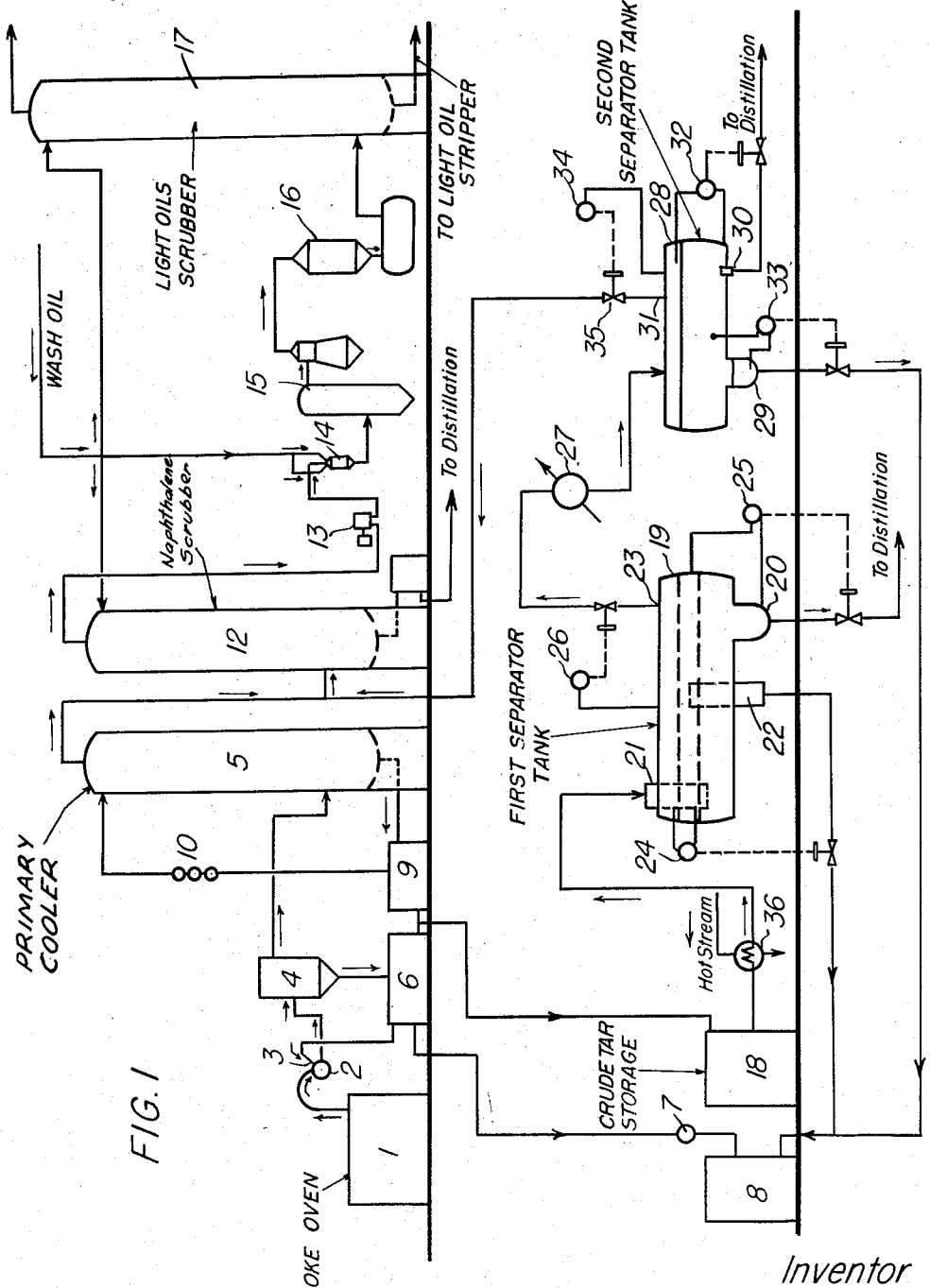

United States Patent Office 2,697,067
Patented Dec. 14, 1954

2,697,067

METHOD AND APPARATUS FOR COKE OVEN BY-PRODUCT RECOVERY

Thomas G. Reynolds, Media, Pa., assignor to United Engineers & Constructors Inc., Philadelphia, Pa., a corporation of Delaware Application September 26, 1950, Serial No. 186,887

6 Claims. (Cl. 196—76)

The present invention relates to the recovery of by-products from hot coke oven gases and particularly to a method and apparatus wherein the tars removed from such gases can be purified.

In the production of coke from carbonaceous materials such as coal, lignite, peat and the like, the carbonaceous material is heated in the absence of air with the formation of hot gases which contain tars, hydrocarbons, such as benzene, naphthalene, anthracene and the like, nitrogenous compounds such as ammonia and cyanide as well as phenols, hydrogen, carbon monoxide and various lower paraffins. It is economically desirable to recover as many of these substances as possible, the heavier materials usually being separated into their respective components and the lighter ends being used for fuel.

Processes and apparatus for the recovery of such by-products have long been known. Modern practice in general calls for treating the gases immediately as they come from the coke ovens with an aqueous washing liquor, whereby they are cooled to from about 60 to about 90° F., with precipitation of most of the tar and solution of a portion of the ammonia. The mixture of tar-washing liquor and ammonia is then run into decanters where the tar separates to a certain extent. The gases, now clear of tar, are passed to various other pieces of equipment where the balance of the ammonia, naphthalene and light oils are removed.

The tar which separates in the decanters generally contains from about 2 to about 15% water and a certain amount of ammonia. Usually it is fed from the decanters to storage tanks where it is batch heated to drive off the ammonia water and certain lighter hydrocarbon constituents. Alternatively, the separation may be accomplished by centrifuging. The purified tar is then used as such or charged to a fractionator for further division among its components.

This practice has several disadvantages. In the first place, the use of a batch evaporation process involves considerably higher labor costs per pound of tar purified. Moreover, with batch evaporation considerable valuable product is lost and heat losses are also high.

With respect to centrifugal separation processes on the other hand, the removal of water is not complete and maintenance, operation and initial costs are high.

It is an object of the present invention to provide a method and apparatus whereby tar can be continuously purified with the substantially complete removal of water and ammonia.

It is another object of the invention to provide for a more complete recovery of all of the ammonia produced in the coke ovens.

It is another object of the invention to provide a source of pure tar which can be used in distillation equipment to produce desired lighter hydrocarbons.

A further object of the invention will appear from a consideration of the following specification and claims.

According to the present invention the impure mixture of water, tar and ammonia is subjected to a heating stage and then to a pressure stage to cause it to separate into at least two phases one of which is substantially pure liquid tar and one of which is a vapor phase. According to the preferred embodiment of the invention, the vapor phase is drawn off and condensed for the further separation of desired components.

In the drawings:

Fig. 1 is a flow diagram of a part of a coke oven by-product recovery process according to the preferred embodiment of the invention wherein the tar, ammonia and water are separated into a vapor phase and two liquid phases in a pressure tank and wherein the vapor is further condensed and separated under pressure;

Fig. 2 is a flow diagram for a tar separation process similar to that shown in Fig. 1 where only one separation stage is employed;

Fig. 3 is a flow diagram of another form of tar separation process according to the invention wherein the tar and ammonia are separated into two phases by flash distillation with subsequent condensation and separation of ammonia and lighter hydrocarbons under controlled pressure;

Fig. 4 is a flow diagram of a tar separation process similar to that of Fig. 3 wherein after flash distillation the components are further separated under available line pressure.

Referring to Fig. 1, the hot tar-laden coke oven gases pass from a coke oven 1 into a collecting main 2 where they are contacted with an aqueous flushing liquor injected through a nozzle 3. The gases are cooled, a certain amount of tar is precipitated and some ammonia is dissolved in the flushing liquor. The gases pass out of the collecting main 2 and after being separated from foul flushing liquor in downcomer 4 are sent through a primary cooler 5 where they are met by more aqueous liquor with the precipitation and absorption of additional tar. The mixture of flushing liquor and tar from the mains is sent to flushing liquor decanter 6 where the tar separates forming in a lower layer and leaving an aqueous upper layer a portion of which is used to flush fresh gas in the main 2, the remainder being sent to ammonia liquor collecting tank 7 and thence to ammonia liquor storage tank 8. The foul liquor from primary cooler 5 is discharged to a circulating liquor decanter 9 where a tar layer and an aqueous layer form. The aqueous layer is recirculated through cooler 10 to the primary cooler 5 where it meets fresh gases.

In the preferred embodiment of the invention shown in Fig. 1, the gases emerging from the top of the primary cooler 5 are passed through naphthalene scrubber 12 where they are advantageously subjected to treatment with an absorber oil for the removal of naphthalene in accordance with the procedure described and claimed in the copending application of G. L. Eaton Serial No. 161,325, now Patent Number 2,649,403. They pass through an exhauster 13 and an intermediate cooler 14 into a saturator 15 where the balance of the ammonia is removed. From the saturator the gases move through a final cooler 16 and thence into a light oil scrubber 17 where the light oils are separated through contact with an absorber oil. The gases emerging from the light oil scrubber are ready to be passed into the fuel mains or to be used in any similar connection.

The tarry layer which settles in the bottom of the decanters 6 and 9 is impure, containing from 2 to 15% water and a certain amount of ammonia. It is therefore unsuitable for use in distillation apparatus without further purification. In the system shown in Fig. 1 the impure tar is delivered to a storage tank 18 prior to such treatment.

According to the preferred embodiment of the invention shown in Fig. 1, a separation apparatus is provided whereby this impure tar can be resolved into its components with production of a tar product substantially free of water and ammonia. The apparatus comprises a first separator tank 19 built to withstand a pressure of at least about 200 p. s. i. g. and having a tar drawoff sump 20 in its bottom. An inlet duct 21 is provided which extends through the top of the tank down to a point past its center line. Also provided is a water outlet 22 which extends from the bottom of the tank upwardly to a point past the center line and a gas outlet 23 located in the top of the tank. Liquid level controls 24 and 25 are installed between appropriate places on the upper and lower halves of the separator. A pressure control 26 is provided to control the back pressure of the gas passing out of the separator through outlet 23.

A line from outlet 23 leads to a condenser 27 where at least a portion of the vapor from tank 19 may be condensed. The condensate is charged to a second separator tank 28.

Tank 28 has a water drawoff pump 29, a liquid hydrocarbon outlet 30 and a vapor outlet as at 31. Liquid level controls 32 and 33 are provided for maintaining the proportions of each component within desired limits. A pressure regulator 34 connecting with a vapor outlet valve 35 is provided for controlling the pressure in the tank.

In operating the device of Fig. 1 the impure tar from storage tank 18 is led through a heat exchanger 36 where its temperature is raised to a point in the range of from about 200 to about 450° F. It enters the tank 19 through inlet duct 21. The pressure of the impure mixture at this point due to its heating is from about 25 to about 200 p. s. i. g. Under these conditions of heat and pressure, it separates into a three-phase system comprising a lower liquid layer of substantially pure tar, an intermediate liquid layer of ammonia water and a vapor phase comprising ammonia, water vapor and light hydrocarbons.

The lower liquid level consisting of separated tar is drawn off from the sump 20 under the control of the liquid level control means 25. The ammonia water is drawn off from the intermediate layer through the outlet duct 22 operating under control of liquid level control means 24 and is charged to ammonia storage tank 8. The vapor forming above the water layer is drawn off under regulation of pressure controller 26 and delivered to condenser 27.

In condenser 27 all of the water and a considerable portion of the hydrocarbon vapors are condensed and form in second separator tank 28 another three-phase system. The pressure in tank 28 is approximately the same as in tank 19. In tank 28 the lower layer which collects in sump 29 consists of ammonia water and the intermediate layer consists of liquid hydrocarbons. The former may be run to ammonia liquor storage 8. The latter may be charged to distillation equipment for separation into its various components. The vapor phase contains light hydrocarbons and ammonia. It may be passed under control of pressure regulator 34 to the suction side of exhauster 13, preferably on the upstream side of naphthalene scrubber 12.

Figs. 2–4 apply to methods for tar purification embodying the invention, which are alternative to the purification method laid out in Fig. 1. Only the equipment necessary for tar purification is shown in Figs. 2–4, the remainder of the by-product recovery process and apparatus being identical with that shown in Fig. 1.

Referring now to Fig. 2, it is possible to dispense with the second separation tank 28 shown in Fig. 1, and in that event the vapor phase forming in separation tank 19 is returned to the suction side of the exhauster as indicated in Fig. 2.

In operating the system of Fig. 2, impure tar from storage tank 18 (Fig. 1) is led through heat exchanger 36 where its temperature is raised to a point in the range of from about 200 to about 350° F. It enters tank 19 through inlet duct 21. The pressure of the impure mixture at this point is from about 25 to about 200 p. s. i. g. Under these conditions, it separates into three phases consisting of a lower tar layer, an intermediate ammonia water layer and an upper vapor phase. The water and tar may be drawn off through outlets 22 and 20 and sent to storage and distillation apparatus respectively as in the embodiment of Fig. 1.

In the case of the vapor phase, however, this is drawn off through outlet 23 under control of pressure regulator 26 and delivered to the suction side of the exhauster where it joins the main gas stream and is processed therewith.

Another embodiment of the invention is shown in Fig. 3. In that figure as in Fig. 2 only the tar purification system is shown, it being understood that other parts of the recovery system may be as shown in Fig. 1.

In the embodiment of Fig. 3, a flash separator drum 43 is provided for receiving the hot crude tar from a heat exchanger 44. A condenser 45 is provided for the vapors from drum 43; a pressure separator tank 46 is provided for the condensate from condenser 45. Tank 46 has an inlet duct 47, a drawoff sump 48, an intermediate outlet 49 and a gas outlet 50. Also provided are liquid level controls 51 and 52 and a pressure regulator 53.

In the operation of the system shown in Fig. 3, crude tar is heated in heat exchanger 44 to a point in the range of from about 200° F. to about 450° F. and introduced at a pressure of from about 25 to about 200 p. s. i. g. into flash separator tank 43, under control of pressure regulator 54. Flash distillation occurs with the formation of a liquid phase consisting of substantially pure tar and a vapor phase comprising ammonia, water and various hydrocarbons. To effect this separation, the pressure drop as the gases enter tank 43 should be from about 25.4 to about 165 p. s. i. g. Thus the pressure in tank 43 should be from about 10 inches of water vacuum where the pressure of the crude tar, as it is introduced, is about 25 p. s. i. g. to about 35 p. s. i. g. where the pressure of the crude tar, as it is introduced, is about 200 p. s. i. g.

The tar layer may be drawn off and charged to distillation equipment (not shown).

The vapor phase is drawn into condenser 45 where all the water and a substantial portion of the liquid hydrocarbons are condensed. The resulting fluids are delivered to pressure separator 46 where they form a lowermost ammonia-water layer, an intermediate hydrocarbon layer and a vapor phase. The water layer may be drawn off through sump 48 under control of liquid level control 51 and sent to ammonia-water storage. The intermediate hydrocarbon layer may be drawn off under control of liquid level control 52 and sent to distillation equipment (not shown). The vapor may be drawn off under control of pressure regulator 53 and sent to the suction side of the exhauster.

The pressure to be used in the flash drum 43 is governed by a number of factors, chief among them being the composition of the impure tar and the temperature of the cooling water available for use in condenser 45. Thus where a large proportion of the tar consists of substances having a relatively low boiling point, the pressure in drum 43 will be higher than where the crude tar contains only a small proportion of low boiling components.

Moreover, the pressure in flash drum 43 is substantially equal to the pressure in separator tank 46, the only difference being that caused by the normal frictional drop. Therefore the pressure in the drum 43 must be high enough so that the cooling water available for use in condenser 45 is able to condense the water vaporized in drum 43. Naturally the temperature of the available water will vary with the location of the plant as well as with seasonal changes.

The system shown in Fig. 4 is essentially a special case in the general system of Fig. 3, applicable where both tar composition and cooling water temperature are satisfactory. In Fig. 4 as in Figs. 2 and 3 only tar separation apparatus is shown, the remainder of the system being the same as Fig. 1.

The apparatus of Fig. 4 comprises a flash separator tank 37 which is connected through a condenser 38 to a pair of decanters 39 and 40. A heat exchanger 41 is provided to raise the temperature of the charge entering flash separator 37 and a pressure regulator 42 is used to control its pressure.

In operation, the impure tar is drawn through heat exchanger 41 where it is raised to a temperature in the range of from about 200 to about 450° F. and then charged to the flash separator tank 37. Before entering the flash separator, the pressure of the impure mixture is from about 25 to about 200 p. s. i. g. Pressure maintained in the separator is the pressure of the suction side of the exhauster, usually about 10 inches of water vacuum.

As the hot high pressure material enters the separator, flash distillation of the volatile portions of the mixture occurs. The resultant vapors contain substantially all the ammonia, water and light hydrocarbons. They are carried overhead and through in condenser 38 where all the water and a good portion of the liquid hydrocarbons are condensed, the condensate being delivered to first decanter 39 where it separates into a lower ammonia-water layer, an intermediate hydrocarbon layer and a vapor phase. The ammonia-water layer may be drawn off and sent to storage. The vapors may be returned to the suction side of the exhauster.

The intermediate hydrocarbon layer is drawn off and delivered to second decanter 40 whence light gaseous components given off on standing may be led to the suction side of the exhauster together with the vapor from the first decanter. The hydrocarbon liquid phase in decanter 40 may be charged to distillation equipment.

The pure tar settling in the bottom of the flash separator 37 may be sent directly to distillation equipment.

The pressure on decanters 39 and 40 will be that of the exhauster suction, i. e. of the coke oven gases before compression, which is normally about 10 inches of water vacuum, less the line drop. The pressure in flash drum 37 is about the same. It will therefore be evident that the system of Fig. 4 can be used only where the nature of the charge and the temperature of the cooling water available for use in condenser 38 are such that all the water and the desired hydrocarbons moving out of drum 37 as vapor, will be condensed.

By means of the methods and apparatus described above, a simple convenient means is provided for the purification of crude coke oven tar. The processes described and claimed are continuous and therefore may be carried out with a minimum of supervision and labor. Moreover, the tar obtained in my novel process is substantially free of water and is eminently suitable for further refining in distillation equipment.

In addition, the apparatus required for the present methods is simple and inexpensive to install and maintain. Product and heat losses are low. Moreover, since the present invention involves a substantially closed system, a high percentage of the ammonia removed from the gases with the tar can be recovered.

It will be understood that although I have illustrated my novel tar purification process in connection with a coke oven recovery system in which the gases are scrubbed with an absorber oil for naphthalene removal, the system is of utility in many other by-product recovery systems. Moreover, various incidental changes may be carried out to make the most efficient use of the novel purification process when considered in connection with the other elements of the particular recovery system involved. For example, in certain types of recovery systems, it may be most efficient to combine the naphthalene rich absorber oil issuing from the naphthalene scrubber with the crude tar entering the purification system, and to subject the combination to the purification treatment.

What is claimed is:

1. In a process for the recovery of by-products from hot coke oven gases wherein an impure tar containing from about 2% to about 15% water, and ammonia, is removed from the hot gases, a method of purifying the impure tar which comprises heating said tar to a point in the range from about 200 to about 450° F. and thereby raising the pressure upon said impure tar, to between about 25 and about 200 pounds per square inch gauge, charging the heated tar to a separatory vessel, maintaining the pressure in said vessel between about 25 pounds per square inch gauge and about 200 pounds per square inch gauge, and thereby forming in said vessel a three-phase system comprising a liquid tar layer, a liquid ammonia-water layer, and a vapor phase, and separately removing material from each of said phases.

2. In a process for the recovery of by-products from hot coke oven gases wherein an impure tar containing from about 2% to about 15% water, and ammonia, is removed from the hot gases, a method of purifying the impure tar which comprises heating the impure tar to a point in the range from about 200 to about 450° F. and thereby raising the pressure upon said impure tar, to between about 25 and about 200 pounds per square inch gauge, charging the heated tar to a separatory vessel, maintaining the pressure in said vessel at between about 25 pounds per square inch gauge and about 200 pounds per square inch gauge, and thereby forming in said vessel a three-phase system comprising a liquid tar layer, a liquid ammonia-water layer and a vapor phase, separately removing material from each of said phases, partially condensing said vapor phase to form a secondary three-phase system comprising a lowest ammonia-water layer, an intermediate liquid hydrocarbon layer, and a vapor phase, and separately removing material from each of said phases.

3. In a process for the recovery of by-products from hot coke oven gases wherein an impure tar containing from about 2% to about 15% water, and ammonia is removed from the hot gases, a method of purifying the impure tar which comprises heating the impure tar to a point in the range of from about 200 to about 450° F. and thereby raising the pressure of said tar to from about 25 to about 200 lbs. per square inch gauge, suddenly lowering the pressure on said tar to from about 10 inches of water vacuum where the tar had previously been at about 25 lbs. per square inch gauge to about 35 lbs. per square inch gauge where the tar had previously been at about 200 lbs. per square inch gauge whereby ammonia, water and certain light hydrocarbons are vaporized leaving a liquid phase consisting of substantially pure tar, partially condensing the vaporized components, subjecting the condensate to a pressure of from about 10 inches of water vacuum to about 35 lbs. per square inch gauge with the formation of a lowest ammonia water layer, an intermediate liquid hydrocarbon layer and a vapor phase and separately removing material from the three phases.

4. In a process for the recovery of by-products from hot coke oven gases, in combination, the steps of removing an impure tar containing from about 2% to about 15% water, and ammonia, from said gases, subsequently compressing the gases, heating the impure tar to a point in the range of from about 200 to about 450° F. and thereby raising the pressure of said impure tar to from about 25 lbs. per square inch gauge to about 200 lbs. per square inch gauge, suddenly lowering the pressure of said impure tar to approximately the pressure of the coke oven gases before compression whereby ammonia, water and light hydrocarbons are vaporized leaving a liquid phase consisting of substantially pure tar; condensing the vaporized components and allowing the condensate to stand under a pressure approximately equal to the pressure of said coke oven gas before compression with the production of an ammonia-water layer, a liquid hydrocarbon layer and a vapor phase.

5. A method as claimed in claim 4 wherein the liquid hydrocarbon layer is decanted from the ammonia water layer and allowed to stand under a pressure approximately equal to the pressure of the coke oven gas before compression with the formation of a vapor phase and wherein the liquid hydrocarbons are then separately removed from said vapor.

6. A method as claimed in claim 5 wherein the pressure of the coke oven gases before compression is about 10 inches of water vacuum.

References Cited in the file of this patent

UNITED STATES PATENTS

| Number | Name | Date |
|---|---|---|
| 2,366,899 | Hall et al. | Jan. 9, 1945 |
| 2,366,900 | Weir | Jan. 9, 1945 |
| 2,366,901 | Janeway | Jan. 9, 1945 |